United States Patent
Rich

[15] 3,694,085
[45] Sept. 26, 1972

[54] MIXING TYPE CONDENSATION NUCLEI METER

[72] Inventor: Theodore A. Rich, Scotia, N.Y.

[73] Assignee: Environment/One Corporation, Schenectady, N.Y.

[22] Filed: Sept. 10, 1970

[21] Appl. No.: 71,060

[52] U.S. Cl. .................356/37, 73/29, 250/218
[51] Int. Cl. .....................G01n 1/10, G01n 21/26
[58] Field of Search.................356/37, 102–104, 356/207; 256/218; 23/232, 254; 73/29, 432 PS; 340/237, 235

[56] References Cited

UNITED STATES PATENTS

| | | | |
|---|---|---|---|
| 3,011,387 | 12/1961 | Johnson | 356/37 |
| 3,011,390 | 12/1961 | VanLuik, Jr. | 356/37 |
| 3,037,421 | 6/1962 | Bigelow et al. | 356/37 |
| 3,463,589 | 8/1969 | Skala | 356/37 |

OTHER PUBLICATIONS

Radke et al., " An Automatic Cloud Condensation Nuclei Counter" J. Applied Meteorology, V. 8, Feb. 1969, pp. 105– 109.

Primary Examiner—Ronald L. Wibert
Assistant Examiner—Orville B. Chew, II
Attorney—Charles W. Helzer

[57] ABSTRACT

A condensation nuclei meter for deriving a count of the condensation nuclei particles entrained in a sample atmosphere. The meter comprises a condensation chamber having a light source and photocell disposed at opposite ends for projecting a light beam through the condensation chamber and deriving an output electric signal from the photocell which is representative of the light modifying effects on the light beam of liquid droplets formed in the condensation chamber. A first filtered gas at a first temperature value and 100 percent relative humidity is introduced in the condensation chamber with the condensation chamber maintained at the first temperature value. A second condensation nuclei particle bearing sample gas to be monitored is then introduced at a second temperature value different from the first temperature and at 100 percent relative humidity at the second temperature. The second gas is rapidly injected and turbulantly intermixed with the first gas within the condensation chamber in a manner to assure rapid mixing at the confluence of the two gases whereby supersaturation occurs and condensation takes place about the condensation nuclei particles as centers of condensation.

17 Claims, 4 Drawing Figures

INVENTOR
THEODORE A. RICH
BY Charles W. Helzer
ATTORNEYS

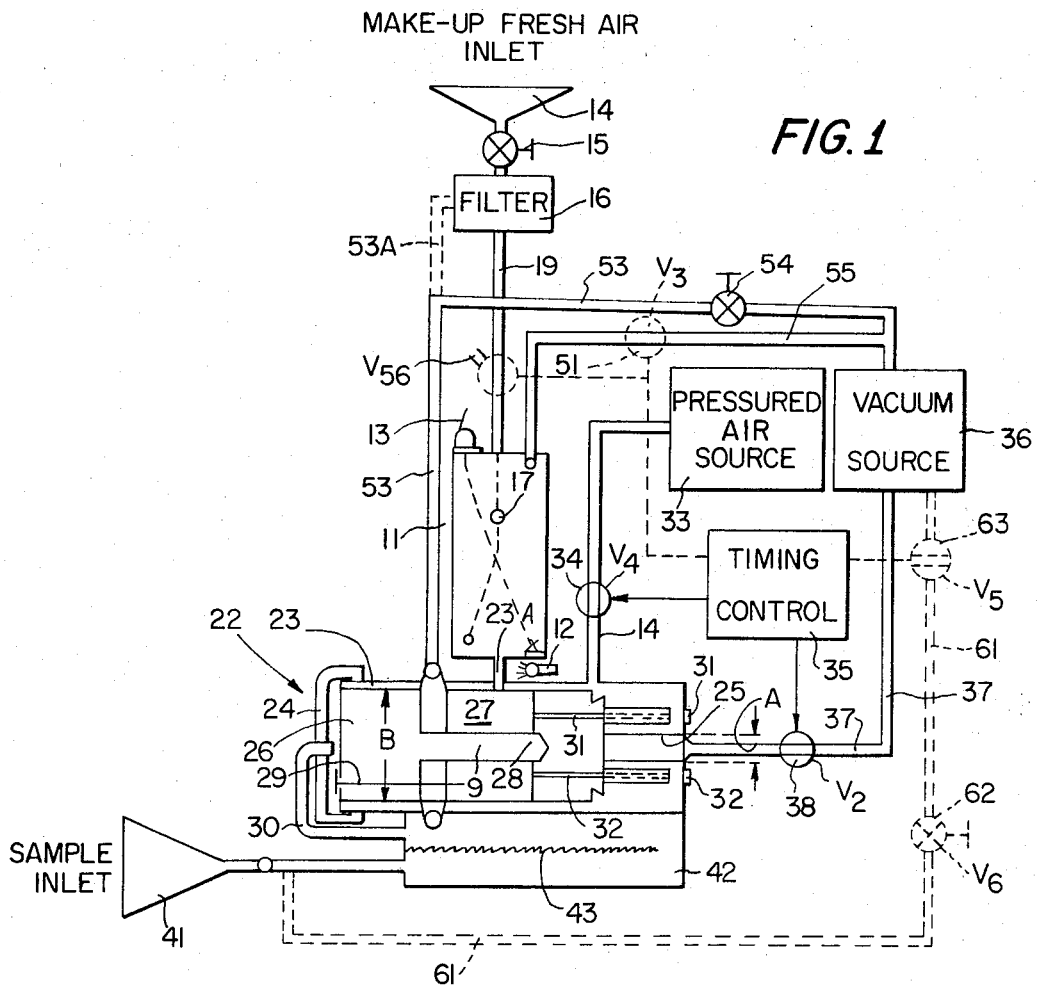
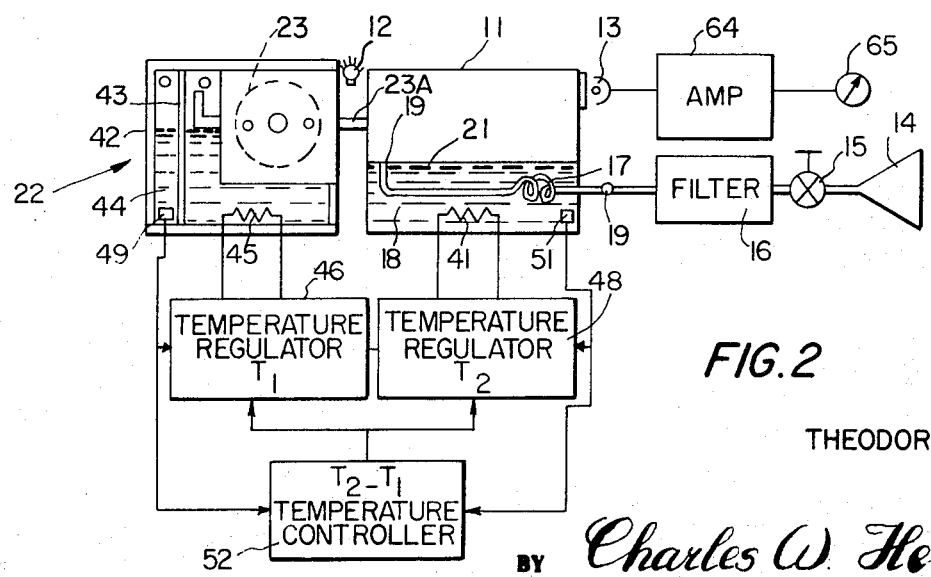

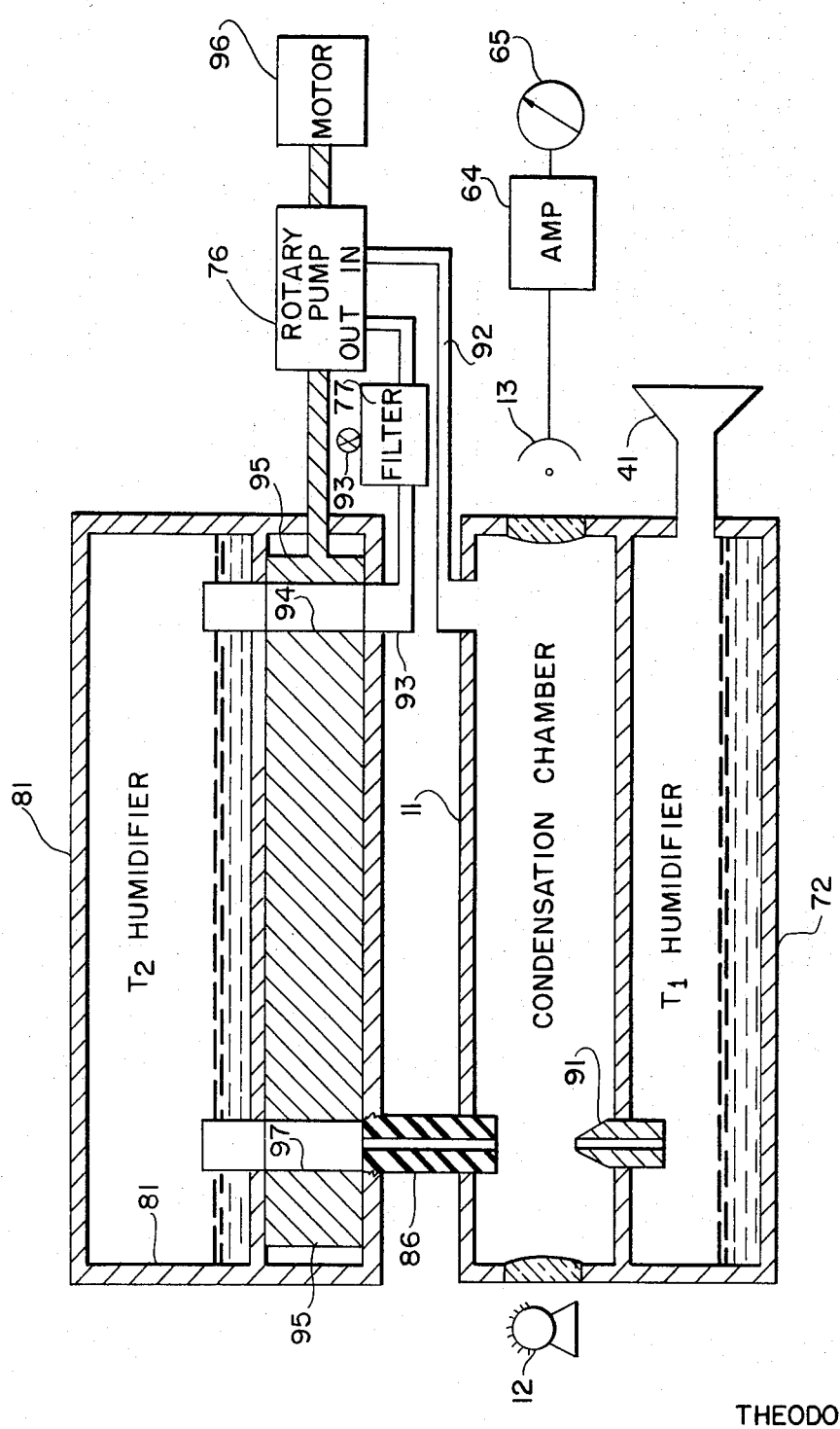

3,694,085

MIXING TYPE CONDENSATION NUCLEI METER

BACKGROUND OF INVENTION

1. Field of Invention

This invention relates to a mixing type condensation nuclei meter.

More specifically, the invention relates to a novel condensation nuclei meter and method of measuring condensation nuclei particles which involves rapidly intermixing two gases at least one of which contains condensation nuclei particles to be measured. The two gases are maintained at different temperatures and at 100 percent relative humidity to cause supersaturation and condensation about the entrained condensation nuclei particles as centers of condensation at the confluence of the rapidly intermixed gases. Measurement of the concentration or numbers of such particles in a given volumetric quantity is then obtained by subjecting the cloud of water droplets formed at the confluence of the two gases to a beam of light and measuring the scattering and/or absorption effect on the light beam.

2. Prior Art Problem

Condensation nuclei particles are extremely small particles (sometimes referred to as aerosol particles) which are entrained in the air and other gaseous atmospheres in large concentrations. These particles may range in size from about $10^{-7}$ centimeters in radius to $5 \times 10^{-3}$ centimeters and are produced in the atmosphere in a number of different ways either naturally or by reason of human activity. For example, very fine dust or sand particles turned up by dust storms and the like becomes entrained in the air and can be transported over great distances. Evaporation of ocean water, atmospheric ionization due to naturally occurring radiation, smoke and exhaust from combustion processes and internal combustion engines, evaporation from asphalt pavement, and other similar sources constitute other known means for production of condensation nuclei particles in the atmosphere. Due to their extremely small size ranging from microscopic to submicroscopic, these particles are difficult to measure and the usual direct means of measurement using light absorption and light scattering techniques can not be applied directly. As a result, condensation nuclei meters (hereinafter referred to as CN meters) have been developed which rely on the property of condensation nuclei particles to serve as the nucleus or center of condensation for a water droplet. By causing condensation of water (or some other condensable liquid) about the nuclei particles as centers of condensation, their size can be greatly increased thereby allowing measurement by light scattering and/or absorption techniques.

There are a number of known CN meters which operate in accordance with the above described principle. The phenomenon involved in the condensation of water about condensation nuclei particles as centers of condensation, generally is dependent both on the size of the condensation nuclei particle and on the relative humidity of the gaseous atmosphere in which it is entrained. If the relative humidity of a gaseous sample having condensation nuclei particles entrained therein tends to rise above 100 percent, such as would occur by supercooling of the sample atmosphere, condensation starts the deposition of water on the nuclei particles as centers of condensation in order to achieve an equilibrium condition. This deposition of water will occur about the larger particles first and will continue through deposition about the smaller particles until the humidity is lowered to a new equilibrium condition representing substantially 100 percent relative humidity for the new, cooler temperature. The number of droplets formed will of course be determined by the number of particles entrained in a given volume of the sample atmosphere (ie concentration of the particles). Hence, the number of size of the cloud of water droplets, and accordingly the light scattering and/or absorption characteristics of the cloud, will be determined by the concentration of the particles.

For a more detailed description of one known form of CN meter using the above principles reference is made to U. S. Pat. No. 2,684,008 issued July 20, 1954. The CN meter described in this patent comprises an expansion chamber that is adapted to hold air or other gaseous samples containing CN particles to be monitored with the expansion chamber being traversed by a light beam from a light source that normally is allowed to impinge upon an electro-optical detector such as a photocell. Input and output conduits to the expansion chamber are controlled by synchronously operated valves and an expansion cycle apparatus which permit a controlled expansion cycle. With this arrangement following the periodic or cyclical introduction of a specimen of a sample gaseous atmosphere into the expansion chamber, a pressure difference suddenly is established by rapidly expanding the volume of the expansion chamber with the expansion valve apparatus. In this manner a very rapid or sudden expansion of the gaseous sample is achieved whereby precise control of the level of supersaturation of the gaseous sample is attained. (which previously has been passed through a humidifier to achieve substantially 100 percent relative humidity). As a result, a cloud of small water droplets is formed whose light modifying characteristics is dependent upon the concentration of the CN particles. A count is obtained of the resulting magnified CN particles through the electro-optic detecting device that derives a pulsed electric output signal whose peak value is representative of the concentration of the CN particles. While this known CN meter is satisfactory in many respect it does require the use of a somewhat expensive and relatively complex expansion cycle apparatus. The present invention has been devised to provide a less expensive somewhat simpler mixing type CN meter utilizing the principle of supersaturation to magnify the size of the CN particles for subsequent measurement, but which achieves the supersaturation condition in a somewhat different manner.

SUMMARY OF INVENTION

It is therefor a primary object of the present invention to provide a novel mixing type CN monitor and method of operation for rapidly intermixing two gases at least one of which contains CN particles. The two gases are maintained at different temperatures and at 100 percent relative humidity to cause supersaturation and condensation about the entrained CN particles as centers of condensation at the confluence of the two intermixed gas streams. Measurement of the concentration of the CN particles is then obtained by subjecting the cloud of water droplets to a beam of light and measuring the scattering and/or absoption effect on the light beam.

In practicing the invention a condensation nuclei meter and method of detection is provided for deriving a count of the condensation nuclei particles entrained in a sample atmosphere. The CN meter includes a condensation chamber having electro-optical detector means viewing the interior of the condensation chamber and a light source for projecting a light beam thereinto. The electro-optical detector derives an output electric signal representative of the light modifying effects on the light beam of a cloud of liquid droplets formed in the condensation chamber. A first means including a humidifier maintained at a first temperature value serves to introduce a first filtered gas at a first temperature value and 100 percent relative humidity at the first temperature value into the condensation chamber. A second means introduces a second condensation nuclei bearing sample gas to be monitored into the condensation chamber at a second temperature value different from the first temperature value and at 100 percent relative humidity at the second temperature. The arrangement is completed by means for rapidly injecting at least one of the gases into the condensation chamber in a manner to assure rapid intermixing at the confluence of the two gases whereby supersaturation suddenly occurs and condensation takes place about the entrained CN particles as centers of condensation.

BRIEF DESCRIPTION OF DRAWINGS

Other objects, features, and many of the attendant advantages of this invention will be appreciated more readily as the same becomes better understood by reference to the following detailed description when considered in connection with the accompanying drawings wherein like parts in each of the several figures are identified by the same reference character and wherein:

FIG. 1 is a schematic plan view of a partially broken away mixing type CN meter constructed in accordance with the invention;

FIG. 2 is a schematic side view of the mixing type CN meter shown in FIG. 1;

FIG. 4 is a modified form of the mixing type CN meter shown in FIG. 3.

DETAILED DESCRIPTION OF PREFERRED EMBODIMENTS

Figure 3:
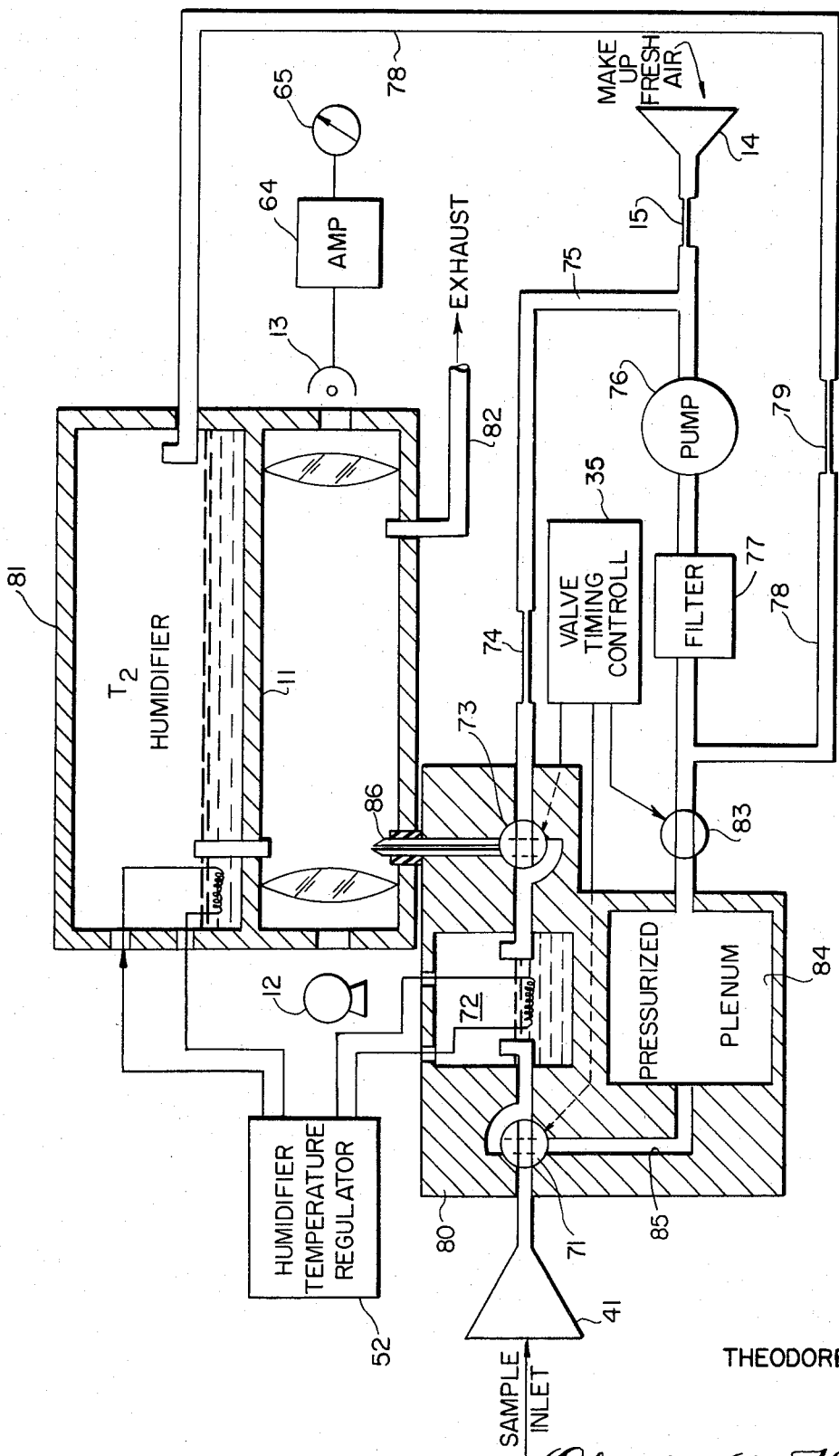
FIG. 3 is a partially broken away schematic view of an alternative form of mixing type CN meter suitable for use in practicing the invention.

FIG. 1 is a schematic illustration of a novel mixing type CN meter suitable for use in practicing the invention. In FIG. 1, a condensation chamber is shown at 11 which is traversed by a light beam from a light source 12 which may comprise a light emitting semiconductor such as a gallium arsenide light emitting diode. Under quiescent conditions, light from source 12 is allowed to impinge upon a photo detector device 13 such as a photo cell, a photo sensitive semicondutor device, a light sensitive resistor, or the like. It is intended with the apparatus shown in FIG. 1 to form a cloud of water droplets periodically within the condensation chamber 11 which will modify the light beam in a manner to produce a pulsed electric output signal in the photo detector device 13. For this purpose, a direct optical arrangement can be employed wherein the light beam from source 12 is allowed to impinge normally on the photo sensitive detector 13. Then, upon the production of a cloud of water droplets in the condensation chamber, the light beam is either scattered and/or absorbed so as to sharply reduce the level of the light impinging on photo detector 13. Alternatively, a dark field optic arrangement could be employed wherein the light beam from source 12 normally is prevented from impinging on the photo sensitive detector 13, but due to the occurance of the cloud of water droplets, scattering of the light beam causes some light to impinge upon detector 13. Either electro-optical arrangement could be employed satisfactorily in the apparatus shown in FIG. 1.

A first filtered gas is supplied to the condensation chamber 11 from a suitable air intake shown at 14 through a flow regulating valve 15, filter 16 and heating coil 17, all of conventional construction and interconnected through a suitable conduit 19. As best shown in FIG. 2 of the drawings, the heating coil 17 is submerged within a heated liquid such as water 18 with the end of the conduit 19 being located above the surface of the heated liquid 18. As a result, the filtered and heated first gas is supplied to condensation chamber 11 and raised to 100 percent relative humidity.

The electro-optical detecting arrangement comprised by light source 12 and photo detector 13 is disposed in the upper portion of the condensation chamber 11 so that it is clear of the heated liquid 18, and a suitable baffling structure or grating 21 is placed intermediate the upper and lower portions of the condensation chamber so as to prevent light scattering or other interfering effects due to ripples on the surface of the liquid 18, from interfering with the electro-optical readout obtained by the instrument. With this arrangement, a gaseous atmosphere such as air is drawn through the intake scoop 14 at a regulated flow rate, filtered and supplied through heating coil 17 up through and into the condensation chamber 11 within the view of the electro-optical detecting means 12 and 13. The gas thus provided to condensation chamber 11 (defined as a first, filtered gas) is bubbled up through the liquid 18 so as to be maintained at 100 percent relative humidity at a first temperature value which shall be defined to be $T_2$.

A suitable valving mechanism 22 is connected to the condensation chamber 11 through a teflon or other insulating connection 23 for introducing into the condensation chamber 11 a second, condensation nuclei particle bearing sample gas to be monitored. The valving mechanism 22 is designed to introduce a known volumetric quantity of the CN particle bearing gas into condensation chamber 11 rapidly so as to assure thorough intermixing at the confluence of the second, particle bearing gas with the first, filtered gas. The valving mechanism 22 also conditions the second CN particle bearing gas so that it is maintained at 100 percent relative humidity at a second temperature value $T_1$ different from the first temperature value $T_2$ of the first gas. In the embodiment of the invention here disclosed, $T_2$ is greater than $T_1 (T_2 > T_1)$.

The valving mechanism 22 is comprised by a cylindrically shaped cylinder member 23 having an internal, uniform bore of diameter B throughout most of its length. One end of the cylinder 23 is closed by a threaded cap 24 that provides an access space to the internal bore of the cylinder and which is vented back to a humidifier space 42 to be described hereinafter through a conduit 30. The remaining end of cylinder 23 is partially closed and contains a central concentric hole 25 of diameter A. Parts 26, 27 and 28 are concentric, cylindrically shaped piston members which reciprocate within the internal bore B and hole 25 in cylinder member 23. The arrangement is such that the piston member 27 can move relative to the piston members 26 and 28 with the piston members 26 and 28 with the piston member 28 being integral with or otherwise connected to the piston member 26. A pin 29 is rigidly connected at one end to the piston 27 and is slidable (at least over a limited distance) with respect to piston 26. A cap or head on pin 29 limits the distance that the pistons 26 and 27 can be separated. A pair of rods 31 and 32 limit the travel (which shall be defined to be the upward travel) of the piston member 7 within bore B of cylinder member 23.

In the position shown in FIG. 1, a slight pressure applied to the bottom of pistons 27 and 28 from a source of pressured air 33 through a flow controlling valve 34 that in turn is controlled by a timing control circuit 35, causes the pistons 26, 27, and 28 to be pushed to the left or topmost position, and leaves a passage or volume of open space between the piston members 26 and 27. As will be explained more fully hereinafter, a volume of sample atmosphere to be monitored is trapped in this passage or space, and thereafter suddenly injected into condensation chamber 11.

Upon a vacuum being applied to the right hand or lower end of the opening 25 from a vacuum source 36 through a conduit 37 and flow control valve 38 that in turn is controlled by timing control circuit 35, pistons 27 and 28 will be pulled to the right or downwardly. Concurrently, or just prior thereto, the flow control valve 34 will have been closed. As piston 27 moves downwardly, it will drag piston 26 along with it gap limited by the pin 9 so as to trap a known volume $V_1$ of the sample atmosphere to be monitored. This known volume of the sample atmosphere which is defined to be the second, CN particle bearing gas is carried down until the passage or space is opposite the connection 23A. Simultaneously with this action, the end of smaller diameter piston 28 enters the small diameter hole 25, and the piston 27 will be stopped by the shoulders formed at the right hand end of cylinder member 23. Under these conditions piston 27 will be stopped but pistons 28 and 26 will continue to move downwardly due to the continued vacuum pull on the end of 28, thus forcing the volume $V_1$ out through the connection 23A into the condensation chamber 11. In this manner, a known volume of the second, CN particle bearing gas is rapidly injected into the condensation chamber at a pressure exceeding the pressure in the condensation chamber and at a rate sufficient to assure turbulant intermixing at the confluence of first and second gases.

To return the valving mechanism 22 to its original condition thereby completing a measurement cycle, pressure is again applied from source 33 and control valve 34 to the bottom of piston 27. This forces piston 27 upwardly to its original position where the rods 31 and 32 will stop it. Concurrently with this operation, or just prior thereto, the control valve 38 will have been closed so that pressure is applied to the bottom of piston 28 as well as after it has come out of the smaller diameter hole 25. As a result piston 28 and piston 26 are forced back to their original position as shown in FIG. 1 with piston members 26 and 27 gap limited by the pin 29 to provide the passage or space between these two members for entrapping another volume of the second particle bearing gas.

The second particle bearing gas is supplied to the passage or space intermediate piston members 26 and 27 by being drawn through a sample inlet or intake 41 into a second humidifier 42 that is maintained at a second temperature $T_1$ different from the first temperature $T_2$. The humidifier 42 includes a felt lining 43 which as best shown in FIG. 2, extends down into and is wetted by a suitable humidifying liquid 44 such as water contained in the bottom of the humidifier 42.

The liquid 44 is maintained at the second temperature $T_1$ by a suitable heating coil 45 supplied from a temperature regulator circuit 46 as shown in FIG. 2. Similarly, a heating coil 47 maintains the liquid 18 in the bottom of condensation chamber 11 at the first temperature $T_2$ and is supplied from a temperature regulator 48. The two temperature regulators 46 and 48 are in turn controlled by suitable temperature sensors 49 and 51, respectively, which also control operation of a $T_2-T_1$ temperature controller 52 that in turn controls operation of the temperature regulators 46 and 48. In this manner the temperature differential between the first and second temperatures ($T_2$ minus $T_1$) can be finely regulated. For example, if the first temperature $T_2$ is 180° F, and the second temperature $T_1$ is set to be 100° F, then the controller 52 will assure that the difference in these two temperature values ($T_2-T_1$) is maintained at 80°. Because of the integral structure of the humidifier 42 with the cylinder member 23 to form the valving mechanism 22, all of the parts of the assembly including the piston members 26–28, etc are in good thermal contact, and also are maintained at the second temperature value $T_1$. Similarly, because of the integral construction of the condensation chamber 11 and the container for the humidifying liquid 18 maintained at temperature $T_2$, all of these parts likewise will be maintained at the first temperature value $T_2$.

The second, CN particle bearing sample gas is drawn through humidifier 42, the space intermediate pistons 26 and 27 and conduit 53 to vacuum source 36, continuously, while the pistons 26–28 are in their uppermost position shown in FIG. 1. Similarly, the first, filtered gas is continuously drawn through the condensation chamber 11 and out through a conduit 55 to the vacuum source 36. This provides a continuous flow of the first filtered gas as the first temperature $T_2$ always being present in the condensation chamber 11 during a measurement cycle and assures maintenance of these parts at steady state conditions. If desired, suitable stop valves shown in phantom at 56 and 57 and controlled by the timing control 35, may be provided for isolating the condensation chamber 11 during the portion of the operating cycle while the sample gas is being injected into the condensation chamber 11 and a reading is being taken by the instrument. As another modification to the arrangement shown, in place of the portion of the conduit 53 containing flow regulating valve 54 and the connection to vacuum source 56, a connection 53A shown in phantom could be made to the input side of filter 16. With such an arrangement, the same, CN particle bearing sample air broughtup to the second temperature $T_1$ (normally around 100° F) can be filtered, and used as the first filtered air that then is broughtup to the first temperature $T_2$ normally around 180° F. Such modification would also serve to stop the sweeping action during the injection of sample gas into condensation chamber 11, so as to obviate the need for isolating valves such as 56 and 57.

In the event that substantially constant sample gas flow is desired, a shunt path can be provided around the instrument by the addition of a conduit 61 shown in phantom which would include a flow regulating valve 62 and control valve 63 that is controlled from the central timing control circuit 35. The arrangement would be such that during intervals while a measurement is being taken of a trapped sample in the condensation chamber 11, the shunt path 66 would be open to allow continuous flow of the sample gas being monitored around the instrument. During intervals while the instrument was being charged to entrap and measure another volume of the sample gas the shunt path 61 would be closed by the control valve 63.

A basic feature of the apparatus shown in FIGS. 1 and 2 is that it allows time between injections of the sample gas for the entire system to come close to steady state conditions, and then to make a sudden, turbulent injection of a known volumetric sample into the condensation chamber, and then measure the maximum density of the cloud of water droplets produced as a result of the injection. One of the main advantages of the system is that there is very little pressure drop between the sensitive volumes employed to make the sudden injection and the ambient surroundings. The sample atmosphere being monitored continuously is drawn through the humidifier 42 where it is brought to the second temperature $T_1$ and 100 percent relative humidity at this temperature and then passed through the space intermediate the piston members 26 and 27. Periodically, this known volume of the sample gas at 100 percent relative humidity and known temperature $T_1$ suddenly is injected into the condensation chamber 11 through operation of the piston members in the previously described manner. Simultaneously with the entrapment and injection of the known volume $V_1$ of the particle bearing sample gas, the first filtered gas is brought to the first temperature $T_2$ which preferably is greater than the temperature $T_1$, and continuously flows into an through the condensation chamber 11. Upon the injection of the particle bearing sample gas at the lower temperature $T_1$ the rapid intermixing at the confluence of the two gases will assure that the supersaturation reaches sufficiently high values to cause water droplet growth about even the smaller particles causing the smaller particles to participate in the water droplet cloud formation. At this point, any of the conventional methods of measuring cloud density can be used.

The light source 12 and photo detector 13 could measure the attenuation between the two points in the condensation chamber due to the production of the cloud of water droplets. Alternatively, dark field illumination could be employed where scattering due to the cloud formation produces a pulsed output signal representative of the concentration of the CN particles in the sample gas being monitored. The louvered plate 21 intermediate the heated humidifying liquid 18 in the bottom of condensation chamber 11 and the upper portion thereof permits water vapor to enter the condensation chamber but prevents light from hitting the water surface which otherwise might produce reflections that would vary the light being received by the photo detector 13 and result in an erroneous reading. The output signal derived by the photo detector 13 is supplied through a suitable amplifier 64 to an indicating meter 65 for providing an output indication of the concentration of the CN particles in the sample atmosphere being monitored. Preferably, the electro-optical arrangement comprised by light source 12 and photo detector 13, amplifier 64 and indicating meter 65 are of the type disclosed in copending U.S. application Ser. No. 840,775-filed July 10, 1969-Theodore A. Rich, inventor-entitled "Self Adjusting Short Pulse Detecting And Amplifying Circuit," and assigned to the Environment/One Corporation.

FIG. 3 is a partially broken away schematic illustration of an alternative form of mixing type CN meter constructed in accordance with the invention. In the embodiment of the invention shown in FIG. 3, a condensation chamber 11 is supplied with a filtered first gas through a sample inlet or intake scoop 41, a three way valve 71 under the control of a central valve timing control 35 and a first humidifier 72 which raises the temperature of the inlet air (which corresponds to the CN particle bearing sample atmosphere to be monitored) to a temperature level which shall be termed to be the second temperature value $T_1$. For this purpose the humidifier 72 (as well as the $T_2$ humidifier to be described hereinafter) can be constructed and operate in the same manner as the humidifier 42 shown in FIGS. 1 and 2. The outlet from the humidifier 72 is supplied through a second three way valve 73 that also is under the control of the central valve timing control 35 through a flow regulating capillary section 74 and conduit 75 to the inlet side of an air pump 76 of conventional construction. The discharge from air pump 76 is supplied through a filter 77, a conduit 78 and second flow regulating capillary 79 to a second humidifier 81 which serves to raise the temperature of the filtered air supply to a higher temperature value which shall be termed a first temperature value $T_2$. The discharge from the second humidifier 81 is then supplied to the condensation chamber 11 and drawn off through an exhaust conduit 82 either through natural air flow or by reason of the presence of a low pressure or vacuum produced at the opposite end of conduit 82. To assure that the temperature differential between the first temperature $T_2$ and the second lower temperature $T_1$ is maintained, a humidifier temperature regulator shown at 52 is provided for controlling the temperature of the humidifiers 72 and 81 and maintaining the temperature difference at a preset value.

In addition to the discharge through conduit 78 to be second humidifier 81, the outlet from filter 77 also is supplied through an on-off control valve 83 that also is under the control of the central valve timing control 35 to a pressure storage vessel or plenum 84. The storage plenum 84 is connected through a conduit 85 to a second inlet of the three way valve 71 that can be switched to connect plenum 84 to humidifier 72 and three way valve 73. The three way valve 73 has two outlets one of which supplies the inlet of pump 76 through conduit 75 with the second outlet being connected through conduit 86 to the condensation chamber 11. The outlet connection from the conduit 86 into condensation chamber 11 is physically disposed with relation to the discharge outlet from humidifier 81 in such a manner as to optimize rapid intermixing at the confluence of the two gases supplied to the condensation chamber 11 through these connections.

It is preferred to construct the $T_1$ humidifier 72, the pressured plenum 84 and three way valves 71 and 73 from a single supporting member 80 so as to assure good thermal contact between all of these elements at the $T_1$ temperature value. Similarly, it is desirable to construct the $T_2$ humidifier 81 and condensation chamber 11 in such a manner that good thermal contact is provided and these elements are maintained at the $T_2$ temperature. An insulating grommet surrounds conduit 86 so as to prevent thermal coupling to block 80 and assures maintenance of the temperature differential ($T_2-T_1$). It is preferred that conduit 86 be in the form of a nozzle to facilitate rapid injection and turbulent intermixing of the gases in condensation chamber 11.

To augment the first filtered gas supplied by pump 76, make up fresh air may be supplied through the intake scoop 14 and flow regulating capillary 15 to the inlet side of the pump 76. Alternatively, this portion of the system could be designed to supply all of the filtered first gas to condensation chamber 11 by appropriate redesign of the conduits and capillary 15 to assure adequate flow. The arrangement shown however is preferred since it places less demanding heat transfer requirements on the second humidifier 81, and is in the interest of economy. In place of the flow regulating capillary sections 74,79,15, etc, flow regulating valves could be employed.

During operation, with the instrument conditioned in the manner shown in solid lines in FIG. 3, the sample gas to be monitored is drawn through the sample inlet 41 and three way valve 71 and supplied to the first humidifier 72. In humidifier 72, the temperature of the sample gas is raised to a temperature value $T_1$ (for example 100° F) and 100 percent relative humidity. From humidifier 72 gas is discharged through three way valve 73, flow regulating capillary 74 and conduit 75 to pump 76. In pump 76, the gas at $T_1$ may be intermixed with make up fresh air and the pressurized outlet gas supplied through filter 77, conduit 78 and flow regulating capillary 79 to the second humidifier 81. In humidifier 81, the temperature of the filtered gas is raised to a temperature value $T_2$ greater than the temperature value $T_1$ and equal say to 180°F. The gas at the discharge side of humidifier 81 at temperature $T_2$ and 100 percent relative humidity then is supplied to the condensation chamber 11 and drawn off through the exhaust conduit 82 in a somewhat continuous operation.

In addition to being supplied to condensation chamber 11, the gas at the outlet side of filter 77 also is supplied through the one way stop valve 83 to the storage plenum 84 and stored at the outlet pressure of pump 76. For example, the storage plenum 84 may have a volume of 100 cubic centimeters and stores the gas at a pressure of 1 pound per square inch gauge and at temperature $T_1$.

At the point in a measurement cycle where a reading is to be taken, three way valve 73 is switched to its dotted line position so that the outlet from the first humidifier 72 is connected directly to condensation chamber 11. During this portion of the measurement cycle, air supply for pump 76 will be made up by the make-up fresh air inlet 14 through regulating capillary 15. At about the same time the on-off control valve 83 is closed thereby isolating the pressurized gas in storage plenum 84. Thereafter, the three way valve 71 is switched to its dotted line position so as to connect the pressure storage plenum 84 through humidifier 72 to the condensation chamber 11. This results in forcing the volume of the particle bearing sample gas at temperature $T_1$ otherwise trapped in humidifier 72 out into condensation chamber 11 at a rapid rate. This causes intermixing at the confluence of the two different temperature gas streams and results in the production of a cloud of water droplets formed about entrained CN particles as centers of condensation. At this point, the central valve timing control circuit 35 conditions the electro-optic detecting circuit comprised by photo detector 13, amplifier 64 and indicating meter 65 to take a peak reading and thereby obtain an indication of the concentration of the CN particles entrained in the sample atmosphere being monitored. The central valve timing control circuit 35 also operates to open and close the three way valves 71, 73 and stop valve 83 at appropriate points in the measurement cycle. For this purpose these valves could be electro mechanical in nature. However if desired they could be designed to be mechanically operated from a central mechanical valve control.

Assuming that the humidifier 72 is comparable in size to the storage plenum 84, and allowing for pressure drops, then about 1/15 × 100cc or approximately 6cc of the particle bearing air stored in humidifier 72 at temperature $T_1$ and 100 percent relative humidity will be forced into condensation chamber 11 to provide the desired reading. The sudden cooling produced within the region of the confluence of the two different temperature gas streams as the result of the rapid injection of the lower temperature particle bearing gas stream, produces supersaturation and the production of a cloud of water droplets about the entrained CN particles as centers of condensation. The mixing of the hot and cold saturated air streams released this water for condensation and is a necessary condition to the formation of the cloud of water droplets. It is also necessary that the mixing of the two different temperature gas streams take place rapidly and not require appreciable time. The provision of this characteristic feature assures that the degree of supersaturation will reach sufficiently high values to cause even the smaller CN particles to grow water droplets and hence produce a measureable effect. If the mixing required appreciable time, the required high values of supersaturation would not occur because condensation can take place simultaneously with the release of water as a result of the mixing, and consequently only the larger particles would grow water droplets. Further, it is desirable that the mixing rate not vary at the confluence of the hot and cold gas stream so that the resulting cloud of water droplets are not of a variable density.

FIG. 4 of the drawings is a partial schematic view of a modified form of the mixing type CN meter shown in FIG. 3. The mixing type CN meter shown in FIG. 3 has the disadvantage of attempting to supercool a comparatively large volume of the particle bearing lower $T_1$ temperature gas which also simultaneously tends to increase the pressure within the expansion chamber 11. Because of this factor adequate supercooling and resultant supersaturation may not occur so as to assure detection of smaller particles present in the sample atmosphere. To provide for this possibility, the arrangement shown in FIG. 4 was devised.

From a consideration of FIG. 4, it will be seen that the gaseous atmosphere being monitored is drawn through the sample inlet 41 into the $T_1$ humidifier 72, through a nozzle 91 into the condensation chamber 11, and thence out through a conduit 92 to the inlet side of a rotary pump 76. Rotary pump 76 discharges the gas at an increased pressure out through filter 77 which preferably has a relief valve 93 connected to it for assuring discharge of the output filtered gas at a pressure on the order of 1 pound per square inch gauge. This discharge gas is supplied under pressure through a conduit 93 and a passage 94 in a rotary valve member 95 to the inlet of the $T_2$ humidifier 81. Thus, it is seen that humidifier 81 serves as both a humidifier and a pressure plenum. The rotary valve member 95 is shafted to and driven in common with the rotary pump 76 by a motor 96.

In humidifier 81, the filtered gas at 1 pound per square inch gauge pressure is brought to the higher $T_2$ temperature and to 100 percent relative humidity at this temperature, and periodically is discharged through outlet passage 97 formed in the rotary valve member 95 and nozzle 86 into condensation chamber 11. Thus, as rotary valve member 95 rotates, it periodically will cause a volume of the filtered gas store in humidifier 81 under pressure and at the higher $T_2$ temperature and 100 percent relative humidity to be discharged through nozzle 86 into condensation chamber 11. Nozzle 86 is connected to condensation chamber 11 and thermally isolated from the condensation chamber by a suitable insulating grommet, and the nozzles 86 and 91 are arranged with respect to each other so as to assure rapid and thorough intermixing at the confluence of the two gas streams supplied to condensation chamber 11. It is desirable that the $T_1$ humidifier and condensation chamber 11 be fabricated as a unitary body in the manner shown in FIG. 4 to provide good thermal coupling between these elements. Likewise, the $T_2$ humidifier and rotary valving member 95 are in close thermal contact to reduce thermal losses. The insulating grommet 86 minimizes thermal coupling between the valving member 95 and the condensation chamber 11. The humidifiers 72 and 81 are maintained at their respective temperature values by suitable temperature regulating schemes similar to those employed in FIGS. 1–3.

Because operation of the mixing type CN meter shown in FIG. 4 is similar in many respects to the instrument shown in FIG. 3, a detailed description of its operation is believed unnecessary. During each rotation of the rotary valve member 95, a volume of the higher $T_2$ temperature filtered gas at 100 percent relative humidity will be injected into the condensation chamber 11 where it thoroughly intermixes with the lower $T_1$ temperature, particle bearing sample gas. Because the particle bearing sample gas in the condensation chamber 11 is maintained as the lower $T_1$ temperature, supercooling and supersaturation of the injected volume of gas and an adequate supply water to initiate condensation around the smaller aerosol particles as centers of condensation, is assured. At this point in the operating cycle, the peak reading of the indicating meter will provide an indication of the concentration of the CN particles present in the sample atmosphere being monitored.

The present mixing type CN meter and its method of operation, is designed to provide rapid, turbulent intermixing at the confluence of the two different temperature gas streams which is reproducible during sequential measurement cycles. The basic purpose of the instrument and method of operation, is to obtain a precise volume of a gas, and to inject it into a warm, saturated atmosphere in a manner so as not to allow the volume of gas to warm up before the instant of injection into the warmer, saturated atmosphere. Further, it will be appreciated that in the disclosed instrument and method of operation, sufficient time is allowed between injection for the measurement system to attain steady state conditions, and then a sudden turbulent injection of a known volumetric sample at a known cooler (or warmer) temperature and 100 percent relative humidity, is obtained. The resultant turbulent intermixing, rapidly and reproducibly forms clouds of water droplets about entrained CN particles as centers that then are measured with a peak reading voltmeter and photo detector arrangement as described earlier. While in the instant embodiments the humidifiers have been disclosed as being heated, it is believed obvious that precise temperature differentials could be obtained through cooling; however, heating is preferred since it is generally much cheaper to than cool.

From the foregoing description it can be appreciated that the invention provides a novel mixing type condensation nuclei meter and method of measuring condensation nuclei particles which rapidly intermixes two different temperature, saturated gas streams at least one of which contains condensation nuclei particles. By maintaining the two gas streams at different temperatures and at 100 percent relative humidity, supersaturation will occur upon the two streams being rapidly and turbulantly intermixed at their confluence, and condensation will take place about entrained condensation nuclei particles as centers of condensation to form a cloud of water droplets. Measurement of the concentration of such particles in a given volumetric quantity is then obtained by subjecting the cloud of water droplets to a beam of light and measuring the scattering and/or absorption effect of the cloud of water droplets on the light beam.

Having described several embodiments of a novel mixing type condensation nuclei meter constructed in accordance with the invention, it is believed obvious that other modifications and variations of the invention are possible in the light of the above teachings. It is therefor to be understood that changes may be made in the particular embodiments of the invention described which are within the full intended scope of the invention as defined by the appended claims.

What is claimed is:

1. A condensation nuclei meter for deriving a count of the condensation nuclei particles entrained in a sample atmosphere comprising a condensation chamber, electro-optical means viewing the interior of the condensation chamber for projecting a light beam thereinto and deriving an output electric signal representative of the light modifying effects on the light beam of liquid droplets formed in the condensation chamber, the liquid droplets being formed about condensation nuclei particles as centers of condensation, means for introducing a first filtered gas at a first pressure and temperature value and at 100 percent relative humidity at the first temperature value into the condensation chamber, means for introducing a second condensation nuclei bearing sample gas to be monitored into the condensation chamber at a second pressure and temperature value different from the first pressure and temperature value and at 100 percent relative humidity at the second temperature, and means for rapidly injecting at least one of said gases into the condensation chamber at a pressure greater than the pressure of the other gas while maintaining the pressure in the condensation chamber substantially unchanged in a manner to assure rapid mixing at the confluence of the two gases whereby supersaturation occurs and condensation takes place about the condensation nuclei particles entrained in the sample gas as centers of condensation due to the temperature differential of the two gases.

2. A condensation nuclei meter according to claim 1 wherein the means for rapidly injecting at least one of the gases into the condensation chamber comprises means for entrapping a known volume of one of the gases at pressure exceeding the pressure in the condensation chamber and for injecting the entrapped volume of gas into the condensation chamber at a rate sufficient to assure turbulent intermixing of the confluent gases.

3. A condensation nuclei meter according to claim 2 wherein the means for introducing the first filtered gas includes a filter element and a first humidifier operated at the first temperature value and disposed in a supply path from a first gas source supplying the means for introducing a first filtered gas into the condensation chamber, and the means for introducing the second condensation nucleii bearing sample gas to be monitored includes a second humidifier operated at the second temperature value and disposed in a supply path intermediate a sample gas inlet and the condensation chamber.

4. A condensation nuclei meter according to claim 3 further including valving means disposed in the supply paths intermediate the condensation chamber and the first gas source and sample gas inlet for controlling introduction of the gases into the condensation chamber in conjunction with the means for rapidly injecting at least one of the gases into the condensation chamber, and valve timing control means for controlling the timing of operation of said valving means.

5. A condensation nuclei meter according to claim 4 further including temperature regulator means coupled to and controlling the temperature of operation of said first and second humidifiers for closely regulating the temperature difference between said first and second temperature values.

6. A condensation nuclei meter according to claim 5 wherein the first filtered gas and the second condensation nuclei bearing sample gas are air and the liquid with which they are saturated at 100 percent relative humidity is water whereby water droplets are formed in the condensation chamber during each operating cycle of the meter. condensation 7. A condensation nuclei meter according to claim 6 wherein the first gas is drawn from a suitable source, filtered, humidified at the first temperature value in the first humidifier and introduced into the condensation chamber, and the second condensation nuclei bearing sample gas is drawn through a sample inlet and second humidifier where it is humidified at the second temperature value and introduced into a known volume collapsible chamber for entrapping a known volume of the humidified sample gas at the second temperature value, said collapsible chamber being connected to said condensation chamber through a suitable valving means, and means for collapsing said collapsible chamber and opening said last mentioned valving means to thereby rapidly inject the entrapped known volume of sample gas at the second temperature value into the condensation chamber where it is turbulently intermixed with first gas to produce water droplets at the confluence of the two gases due to rapid cooling and supersaturation of one of the gases.

8. A condensation nuclei meter according to claim 7 wherein the known volume collapsible chamber is comprised by a housing interposed between one of said humidifiers and the condensation chamber, a pair of reciprocally and relatively movable, spaced-apart piston members slidably supported within said housing for entrapping a known volume of one of the gases flowing out of the humidifier through a portion of the housing intermediate the spaced-apart piston members, said piston members being movable apart to entrap a known volume of gas and thereafter relatively movable together to squeeze the entrapped volume rapidly out into a passageway interconnected through the last mentioned valving means with the condensation chamber, a source of pressurized air and a vacuum source interconnected with the housing through suitable conduits, control valves for controlling the reciprocal movement of said piston members disposed in the conduits, valve timing control means for controlling the alternate opening and closing of the control valves whereby the reciprocally movable spaced apart members are caused to reciprocate back and forth within the housing, piston arresting means for arresting the movement of one of the pistons while allowing the other to close the space therebetween and rapidly squeeze out the volume of gas trapped between the spaced-apart pistons into the condensation chamber and said vacuum source being coupled to said expansion chamber and to said housing portion for entrapping a sample volume intermediate the spaced-apart, reciprocally movable pistons through suitable conduit and flow regulating means for causing sample gas flow through the meter.

9. A condensation nuclei meter according to claim 8 wherein the condensation chamber and one of the humidifiers comprises a unitary structure containing a pool of water through which one of the gases is bubbled for humidification, said humidifier portion being separated from the expansion chamber portion by light baffles for preventing specular reflection due to, wave action and the like from interfering with the electro-optic read-out of water droplet formation in the expansion chamber.

10. A condensation nuclei meter according to claim 9 further including by-pass conduit means interposed between the sample gas inlet and the vacuum source on-off control valve means and flow regulating control valve means interposed in the by-pass conduit for controlling and regulating flow therethrough, and additional on-off control valve means disposed in the supply path to and from the condensation chamber from one of the gas supply sources and the vacuum source during periods of rapid injection into the condensation chamber.

11. A condensation nuclei meter according to claim 6 further including conduit means for supplying the condensation nuclei bearing gas sample drawn through a sample inlet during non-measurement periods to the first humidifier where it is humidified at the first temperature value, pumping means for pumping gas supplied through the first humidifier to a higher pressure, filter means supplied by said pump means to form the first filtered gas, and conduit means supplying the first filtered gas to the second humidifier where it is humidified at the second temperature value and introduced into the condensation chamber and continuously drawn off and exhausted, means for storing a volume of the filtered first gas prior to being humidified at the second temperature value in a plenum under pressure, and conduit means coacting with the valving means during measurement periods to connect the pressured plenum through the first humidifier to the condensation chamber rapidly whereby the condensation nuclei bearing sample gas contained in the first humidifier at the first temperature value suddenly is injected into the condensation chamber where it is turbulently intermixed with the filtered first gas at the second temperature value to produce supersaturation of one of the gases and formation of water droplets about the entrained condensation nuclei particles as centers of condensation.

12. A condensation nuclei meter according to claim 11 further including flow regulating means interposed in the conduit means for regulating the flow rate from the first humidifier to the pump means and the flow rate from the pump means to the second humidifier.

13. A condensation nuclei meter according to claim 12 further including means for introducing make up fresh-air into the flow path intermediate the outlet from the first humidifier and the inlet to the pump means, and means for regulating the flow rate of such make-up fresh air.

14. A method of deriving a count of the condensation nuclei particles entrained in a sample atmosphere with a condensation chamber having electro-optical means viewing the interior of the condensation chamber for projecting a light beam thereinto and deriving an output electric signal representative of the light modifying effects on the light beam of liquid droplets formed in the condensation chamber, the liquid droplets being formed about condensation nuclei particles as centers of condensation, said method comprising introducing a first filtered gas at a first temperature value and 100 percent relative humidity at the first temperature value into the condensation chamber, and introducing a second condensation nuclei bearing sample gas to be monitored into the condensation chamber at a second temperature value different from the first temperature value and at 100 percent relative humidity at the second temperature, injecting at least one of said gases rapidly into the condensation chamber to assure rapid intermixing at the confluence of the two gases to introduce supersaturation and condensation about the condensation nuclei particles entrained in the sample gas as centers of condensation to form a cloud of liquid droplets in the chamber which are proportional in number to the number of condensation nuclei particles, illuminating the cloud of liquid droplets with a light beam, detecting changes in intensity of the light beam as a result of the cloud of water droplets with the electro-optical means, and indicating the value of the changes as a measure of the number of condensation nuclei particles contained in the sample atmosphere.

15. A method of measuring condensation nuclei particles according to claim 14 wherein at least one of the gases introduced into the condensation chamber is entrapped in a known volume at a pressure exceeding the pressure in the condensation chamber and the entrapped volume of gas injected into the condensation chamber at a rate sufficient to assure turbulent intermixing of the confluent gases.

16. A method of measuring condensation nuclei particles according to claim 15 wherein the first filtered gas is drawn from a suitable source, filtered, humidified at the first temperature value and introduced into the condensation chamber, and the second condensation nuclei bearing sample gas is drawn through a sample inlet humidified at the second temperature value, entrapped in a known volume and then injected rapidly into the condensation chamber by collapse of the known volume where it is turbulently intermixed with first gas to produce water droplets at the confluence of the two gases due to rapid cooling and supersaturation of one of the gases.

17. A method of measuring condensation nuclei particles according to claim 15 wherein during non-measurement intervals a condensation nuclei bearing gas is humidified at the first temperature, pumped and flow regulated, filtered and the resulting filtered gas supplied under pressure to a storage plenum and at a second regulated flow rate humidified at the second temperature and supplied to the condensation chamber and during measurement intervals while maintaining the pumped, filtered and regulated flow of gas humidified at the second temperature through the condensation chamber, rapidly switching the pressured volume of humidified filtered gas at the first temperature to rapidly isolate and inject a known volume of nuclei particle bearing sample gas humidified at the first temperature into the condensation chamber where it is turbulently intermixed with the filtered gas at the second temperature value to produce supersaturation of one of the gases and formation of water droplets about the entrained condensation nuclei particles as centers of condensation.

* * * * *